US009577754B2

(12) United States Patent
Zhao et al.

(10) Patent No.: US 9,577,754 B2
(45) Date of Patent: Feb. 21, 2017

(54) NONRADIATIVE COMMUNICATION TERMINAL AND COMMUNICATION SYSTEM USING VISIBLE LIGHT FOR COMMUNICATION

(71) Applicant: HUIZHOU TCL MOBILE COMMUNICATION CO., LTD., HuiZhou, Guangdong (CN)

(72) Inventors: Shiqing Zhao, HuiZhou (CN); Dexiang Edward Luo, HuiZhou (CN); Xuelong Ronald Hu, HuiZhou (CN); Aiping Guo, HuiZhou (CN)

(73) Assignee: HUIZHOU TCL MOBILE COMMUNICATION CO., LTD., Huizhou, Guangdong (CN)

( * ) Notice: Subject to any disclaimer, the term of this patent is extended or adjusted under 35 U.S.C. 154(b) by 21 days.

(21) Appl. No.: 14/443,238

(22) PCT Filed: Jun. 10, 2014

(86) PCT No.: PCT/CN2014/079555
§ 371 (c)(1),
(2) Date: May 15, 2015

(87) PCT Pub. No.: WO2015/109728
PCT Pub. Date: Jul. 30, 2015

(65) Prior Publication Data
US 2016/0277107 A1  Sep. 22, 2016

(30) Foreign Application Priority Data

Jan. 27, 2014  (CN) .......................... 2014 1 0039409

(51) Int. Cl.
*H04B 10/116* (2013.01)
*H04B 10/10* (2006.01)

(52) U.S. Cl.
CPC .................................. *H04B 10/116* (2013.01)

(58) Field of Classification Search
CPC ...................................................... H04B 10/116
(Continued)

(56) References Cited

U.S. PATENT DOCUMENTS 5,239,295 A *  8/1993  DeLuca ............... H04B 10/116
                                                340/7.4
6,348,682 B1 *  2/2002  Lee ......................... H03F 3/087
                                                250/214 A
(Continued)

FOREIGN PATENT DOCUMENTS

CN   102148641 A   8/2011
CN   102882600 A   1/2013
(Continued)

*Primary Examiner* — Oommen Jacob
(74) *Attorney, Agent, or Firm* — Ladas & Parry LLP

(57) ABSTRACT

A nonradiative communication terminal and a communication system which use visible light for communication are provided. The nonradiative communication terminal includes a visible light emission module, a visible light reception module, and a central processing unit. The visible light emission module and the visible light reception module are connected with the central processing unit. By using visible light to communicate with other visible light communication terminals, the advantages, such as nonradiation, saving frequency resources, stability and reliability in communication performance, low-cost communication, and high transmission speed are achieved.

10 Claims, 2 Drawing Sheets

(58) Field of Classification Search
USPC .......................................................... 398/118
See application file for complete search history.

(56) References Cited

U.S. PATENT DOCUMENTS

| | | | | |
|---|---|---|---|---|
| 6,548,967 | B1* | 4/2003 | Dowling | G06Q 30/0201 315/307 |
| 6,614,126 | B1* | 9/2003 | Mitchell | H04B 10/1149 307/9.1 |
| 6,660,991 | B2* | 12/2003 | Brombacher | H03M 3/00 250/214 A |
| 7,075,051 | B2* | 7/2006 | Kashiura | G01J 1/44 250/214 A |
| 8,263,928 | B1* | 9/2012 | Efimov | G02F 1/011 250/227.11 |
| 8,692,669 | B2* | 4/2014 | Mayer | G08B 13/00 340/541 |
| 8,754,585 | B1* | 6/2014 | Bahrehmand | H05B 33/0818 315/287 |
| 2008/0013963 | A1* | 1/2008 | Naoe | H03K 5/1252 398/202 |
| 2009/0010654 | A1* | 1/2009 | Shin | H04B 10/116 398/135 |
| 2009/0196622 | A1* | 8/2009 | Shin | H04B 10/1149 398/118 |
| 2010/0231197 | A1* | 9/2010 | Jamieson | G01R 15/125 324/115 |
| 2011/0038638 | A1 | 2/2011 | Son et al. | |
| 2011/0091220 | A1* | 4/2011 | Rajagopal | H04B 10/116 398/172 |
| 2011/0253915 | A1* | 10/2011 | Knapp | H04L 12/40013 250/553 |
| 2013/0016978 | A1 | 1/2013 | Son et al. | |
| 2013/0236183 | A1* | 9/2013 | Chao | H05B 33/0827 398/101 |
| 2013/0278151 | A1* | 10/2013 | Lear | H05B 33/0839 315/164 |
| 2013/0285565 | A1* | 10/2013 | Feng | H05B 33/0839 315/186 |
| 2014/0334825 | A1* | 11/2014 | Pandharipande | H04L 12/6418 398/128 |
| 2015/0098708 | A1* | 4/2015 | Kido | H04B 10/116 398/118 |
| 2015/0171962 | A1* | 6/2015 | Archer | H04B 10/11 398/118 |

FOREIGN PATENT DOCUMENTS

| | | |
|---|---|---|
| CN | 102904647 A | 1/2013 |
| CN | 202772896 U | 3/2013 |
| CN | 103312412 A | 9/2013 |
| CN | 103490814 A | 1/2014 |
| CN | 103763031 A | 4/2014 |

* cited by examiner

NONRADIATIVE COMMUNICATION TERMINAL AND COMMUNICATION SYSTEM USING VISIBLE LIGHT FOR COMMUNICATION

FIELD OF THE INVENTION

The present invention relates to a communication technology, and more particularly to a nonradiative communication terminal and a communication system which use visible light for communication.

BACKGROUND OF THE INVENTION

With the development on technology, a person has one or more communication terminals, such as mobile phones. The communication terminals have become people's indispensable communication tools in daily life and work. Nowadays, the communication terminals, such as mobile phones, use radio waves as a medium for communication. As is well known, the radiation intensity of the radio frequency waves is greater, so that people's health will be affected and the communication quality will greatly be affected by the signal quality. Thus, the radio frequency communication technique also suffers from a number of disadvantages.

SUMMARY OF THE INVENTION

In view of the deficiencies of the prior art as described above, an object of the present invention is to provide a nonradiative communication terminal and a communication system which use visible light for communication. By using the visible light to communicate, a radiation problem in a conventional communication terminal is solved.

In order to achieve the above-mentioned object, the technical solution of the present invention is as follows:

A nonradiative communication terminal using visible light for communication comprises:

A visible light emission module used for emitting visible light.

A visible light reception module used for receiving the visible light and converting the visible light to an electrical signal.

A central processing unit used for controlling working statuses of the visible light emission module and the visible light reception module and processing data transmitted and received by using the visible light.

The visible light emission module and the visible light reception module are respectively connected with the central processing unit.

In the nonradiative communication terminal using the visible light for communication of the present invention, the visible light emission module comprises a light emitting diode and a high-speed switch.

A negative terminal of the light emitting diode is grounded. A positive terminal of the light emitting diode is connected with a first end of the high-speed switch. A second end of the high-speed switch and a controlling terminal of the high-speed switch are respectively connected with the central processing unit.

In the nonradiative communication terminal using visible light for communication of the present invention, the central processing unit comprises a resistance adjustment unit which is connected with the second end of the high-speed switch.

In the nonradiative communication terminal using visible light for communication of the present invention, the light emitting diode is turned on when the central processing unit outputs a high voltage to the controlling terminal of the high-speed switch. The light emitting diode is turned off when the central processing unit outputs a low voltage to the controlling terminal of the high-speed switch.

In the nonradiative communication terminal using visible light for communication of the present invention, the visible light reception module comprises:

A visible light reception unit used for receiving visible light and converting the visible light to an electrical signal.

An amplifier unit used for amplifying the electrical signal outputted from the visible light reception unit.

A comparator used for performing a quantification operation on a signal from the amplifier unit.

The visible light reception unit is connected to a negative input end of the comparator through the amplifier unit. A positive input end of the comparator is connected with a voltage reference. An output end of the comparator is connected with the central processing unit.

In the nonradiative communication terminal using the visible light for communication of the present invention, if the visible light is present after performing the quantification operation by the comparator, the output end of the comparator outputs a high voltage to the central processing unit. If the visible light is absent after performing the quantification operation by the comparator, the output end of the comparator outputs a low voltage to the central processing unit.

In the nonradiative communication terminal using visible light for communication of the present invention, the visible light reception unit comprises a light sensitive diode and a first resistor.

A negative terminal of the light sensitive diode is connected with a power supply end (VCC). A positive terminal of the light sensitive diode is connected with the amplifier unit. The positive terminal of the light sensitive diode is further grounded through the first resistor.

In the nonradiative communication terminal using visible light for communication of the present invention, the amplifier unit comprises a transistor and a second resistor.

A base of the transistor is connected with the positive terminal of the light sensitive diode. The base of the transistor is further grounded through the first resistor. A collector of the transistor is connected to the power supply end (VCC) through the second resistor. The collector of the transistor is further connected with the negative input end of the comparator. An emitter of the transistor is grounded.

In the nonradiative communication terminal using visible light for communication of the present invention, the visible light reception unit comprises a light sensitive transistor, a third resistor, and a fourth resistor.

A collector of the light sensitive transistor is connected to the power supply end (VCC) through the third resistor. An emitter of the light sensitive transistor is grounded through the fourth resistor. A base of the light sensitive transistor receives an external visible light signal.

In the nonradiative communication terminal using visible light for communication of the present invention, the amplifier unit comprises a transistor and a fifth resistor.

A base of the transistor is connected with the emitter of the light sensitive transistor. The base of the transistor is further grounded through the fourth resistor. A collector of the transistor is connected to the power supply end (VCC) through the fifth resistor. The collector of the transistor is further connected with the negative input end of the comparator. An emitter of the transistor is grounded.

The present invention further provides a nonradiative communication system using visible light for communication comprising at least two nonradiative communication terminals which communicate by visible light.

The nonradiative communication terminal using visible light for communication comprises:

A visible light emission module used for emitting visible light.

A visible light reception module used for receiving the visible light and converting the visible light to an electrical signal.

A central processing unit used for controlling working statuses of the visible light emission module and the visible light reception module and processing data transmitted and received by using the visible light.

The visible light emission module and the visible light reception module are respectively connected with the central processing unit.

In the nonradiative communication system using visible light for communication of the present invention, the visible light emission module comprises a light emitting diode and a high-speed switch.

A negative terminal of the light emitting diode is grounded. A positive terminal of the light emitting diode is connected with a first end of the high-speed switch. A second end of the high-speed switch and a controlling terminal of the high-speed switch are respectively connected with the central processing unit.

In the nonradiative communication system using visible light for communication of the present invention, the central processing unit comprises a resistance adjustment unit which is connected with the second end of the high-speed switch.

In the nonradiative communication system using visible light for communication of the present invention, the light emitting diode is turned on when the central processing unit outputs a high voltage to the controlling terminal of the high-speed switch. The light emitting diode is turned off when the central processing unit outputs a low voltage to the controlling terminal of the high-speed switch.

In the nonradiative communication system using visible light for communication of the present invention, the visible light reception module comprises:

A visible light reception unit used for receiving visible light and converting the visible light to the electrical signal.

An amplifier unit used for amplifying the electrical signal outputted from the visible light reception unit.

A comparator used for performing a quantification operation on a signal from the amplifier unit.

The visible light reception unit is connected to a negative input end of the comparator through the amplifier unit. A positive input end of the comparator is connected with a voltage reference. An output end of the comparator is connected with the central processing unit.

In the nonradiative communication system using visible light for communication of the present invention, if the visible light is present after performing the quantification operation by the comparator, the output end of the comparator outputs a high voltage to the central processing unit. If the visible light is absent after performing the quantification operation by the comparator, the output end of the comparator outputs a low voltage to the central processing unit.

In the nonradiative communication system using visible light for communication of the present invention, the visible light reception unit comprises a light sensitive diode and a first resistor.

A negative terminal of the light sensitive diode is connected with a power supply end (VCC). A positive terminal of the light sensitive diode is connected with the amplifier unit. The positive terminal of the light sensitive diode is further grounded through the first resistor.

In the nonradiative communication system using visible light for communication of the present invention, the amplifier unit comprises a transistor and a second resistor.

A base of the transistor is connected with the positive terminal of the light sensitive diode. The base of the transistor is further grounded through the first resistor. A collector of the transistor is connected to the power supply end (VCC) through the second resistor. The collector of the transistor is further connected with the negative input end of the comparator; and an emitter of the transistor is grounded.

In the nonradiative communication system using visible light for communication of the present invention, the visible light reception unit comprises a light sensitive transistor, a third resistor, and a fourth resistor.

A collector of the light sensitive transistor is connected to the power supply end (VCC) through the third resistor. An emitter of the light sensitive transistor is grounded through the fourth resistor. A base of the light sensitive transistor receives an external visible light signal.

In the nonradiative communication system using visible light for communication of the present invention, the amplifier unit comprises a transistor and a fifth resistor.

A base of the transistor is connected with the emitter of the light sensitive transistor. The base of the transistor is further grounded through the fourth resistor. A collector of the transistor is connected to the power supply end (VCC) through the fifth resistor. The collector of the transistor is further connected with the negative input end of the comparator. An emitter of the transistor is grounded.

In comparison with the prior art, in the nonradiative communication terminal and the communication system which use visible light for communication of the preset invention, visible light is emitted by a visible light emission module. When a visible light reception module receives the visible light, a signal received from the visible light reception module is processed. By using the visible light to communicate with other visible light communication terminal, the advantages, such as nonradiation, saving frequency resources, stability and reliability in communication performance, low-cost communication, and high transmission speed are achieved.

DETAILED DESCRIPTION OF THE INVENTION

The present invention provides a nonradiative communication terminal and a communication system which use visible light for communication. In order to make the objectives, technical solutions, and advantages of the present invention clearer, the present invention will be further described below with reference to the attached drawings and embodiments thereof. It should be understood that the embodiments described herein are only intended to illustrate but not to limit the present invention.

In the nonradiative communication terminal which uses visible light for communication of the preset invention, audio information and data are transmitted by the visible light, so as to solve a radiation problem of a communication terminal. It's healthy and nonradiative. Moreover, by fully utilizing a natural resource, a limited frequency resource can be saved.

Figure 1:
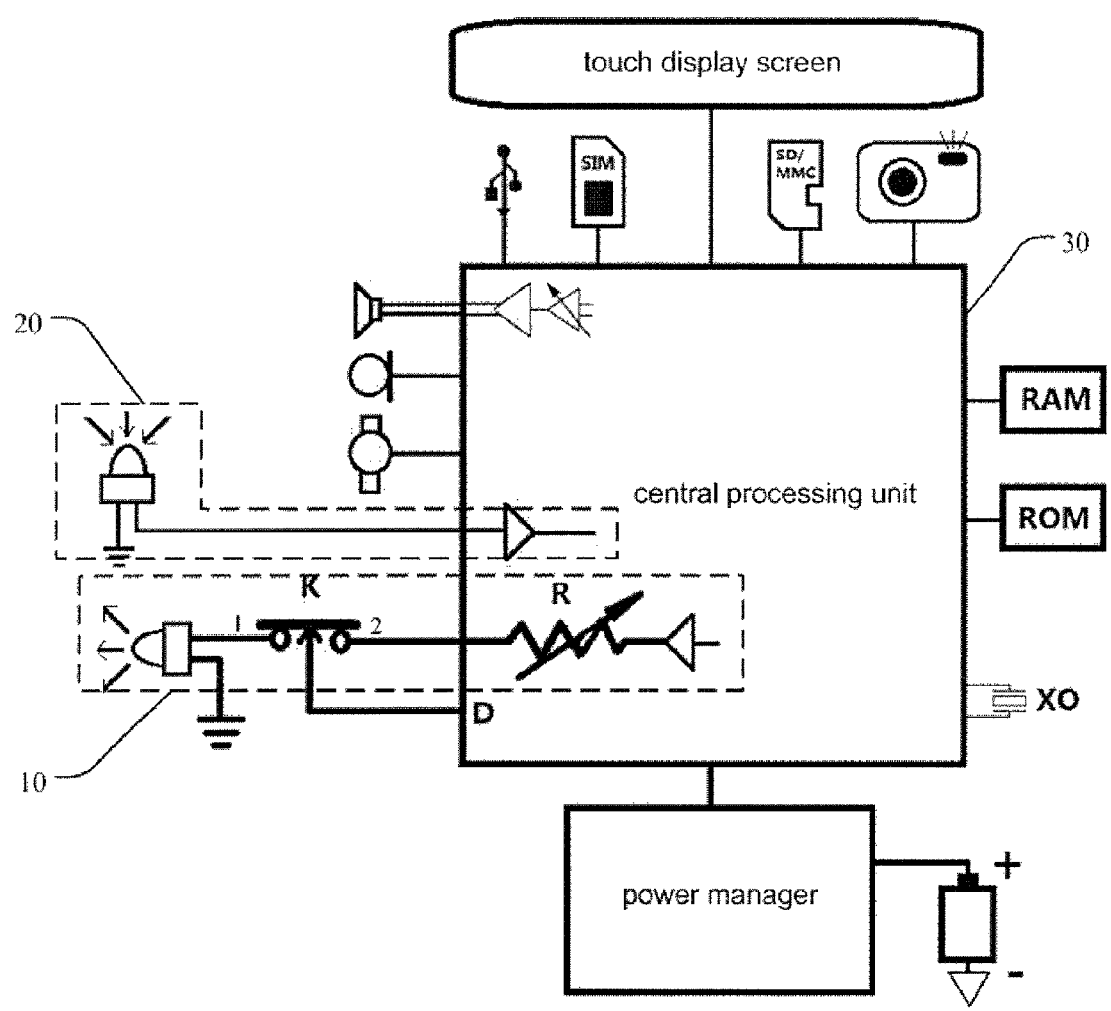
FIG. 1 is a circuit schematic of a nonradiative communication terminal using visible light for communication of the present invention.

Please refer to FIG. 1, which is a circuit schematic of a nonradiative communication terminal using visible light for communication of the present invention. As shown on FIG. 1, the nonradiative communication terminal using visible light for communication of the present invention comprises: a visible light emission module 10, a visible light reception module 20, and a central processing unit 30. The visible light emission module 10 and the visible light reception module 20 are connected with the central processing unit 30.

The central processing unit 30 is used for controlling a working statue of the visible light emission module 10. When the central processing unit 30 controls the visible light emission module 10 to work, the visible light emission module 10 emits visible light. When the central processing unit 30 controls the visible light emission module 10 to stop working, the visible light emission module 10 does not emit visible light. The visible light reception module 20 is used for receiving the visible light and converting the visible light to an electrical signal which is transmitted to the central processing unit 30. The central processing unit 30 is also used to process a signal received from the visible light reception module 20 and to communicate with other visible light communication terminals by using the visible light.

In an embodiment, the visible light emission module 10 comprises: a light emitting diode (LED) and a high-speed switch K. A negative terminal of the light emitting diode is grounded. A positive terminal of the light emitting diode is connected with a first end of the high-speed switch K. A second end and a controlling terminal of the high-speed switch K are connected to a central processing unit 30. The central processing unit 30 controls the high-speed switch K to connect or disconnect by transmitted a high or a low voltage for controlling the light emitting diode to be turned on or off. When a controlling pin D of the central processing unit 30 outputs a high voltage, the high-speed switch K is connected, thereby turning on the light emitting diode. When the controlling pin D of the central processing unit 30 outputs a low voltage, the high-speed switch K is disconnected, thereby turning off the light emitting diode. Thus, by utilizing the presence or absence of the visible light to transmit information, audio and data communications are achieved.

In this embodiment, the central processing unit 30 is provided with a resistance adjustment unit (not shown on Figs.). The resistance adjustment unit is connected with the second end of the high-speed switch K. The luminance of the light emitting diode is controlled by a resistance outputted by the resistance adjustment unit. Under the same conditions (such as light emitting diodes with a same power), this allows the communication terminal to communicate over long distances. In the embodiment, the resistance adjustment unit is an adjustable resistor R. The adjustable resistor R is disposed on the central processing unit for automatically adjusting the luminance of the light emitting diode. A resistance of the adjustable resistor R is smaller and the luminance of the light emitting diode is greater. The resistance of the adjustable resistor R is greater and the luminance of the light emitting diode is smaller. The adjustable resistor R can also be disposed on the outside of the central processing unit for manually adjusting the luminance of the light emitting diode.

Figure 2:
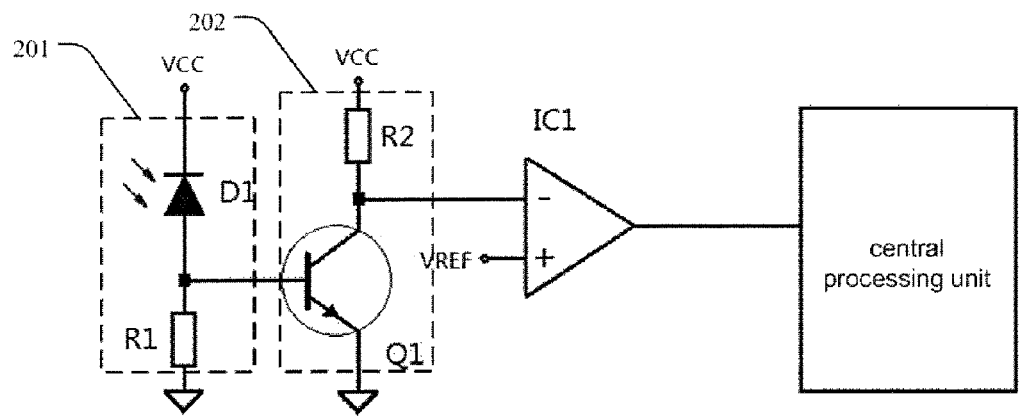
FIG. 2 is a circuit diagram of a visible light reception module of the nonradiative communication terminal using visible light for communication of the present invention of a first preferable embodiment of the present invention.

Please refer to FIG. 2, which is a circuit diagram of a visible light reception module of the nonradiative communication terminal using visible light for communication of the present invention of a first preferable embodiment of the present invention. The visible light reception module 20 comprises a visible light reception unit 201, an amplifier unit 202, and a comparator 101. The visible light reception unit 201 is connected to a negative input end of the comparator 101 through the amplifier unit 202. A positive input end of the comparator 101 is connected with a voltage reference. An output end of the comparator IC1 is connected with the central processing unit 30.

The visible light reception unit 201 is used for receiving the visible light and converting the visible light to an electrical signal with a corresponding intensity according to the luminance of the visible light. The amplifier unit 202 is used for amplifying the electrical signal outputted from the visible light reception unit 201. The comparator IC1 is used for performing a quantification operation on a signal from the amplifier unit. The quantified signal is received and processed by the central processing unit 30. In this embodiment, if the visible light is present after performing the quantification operation by the comparator IC1, the comparator determines the voltage is high and outputs a "1". If the visible light is absent, the comparator determines the voltage is low and outputs a "0". The central processing unit 30 identifies and processes binary signals composed by the "1" and "0" and a flicker frequency the LED for communicating. In the conventional radio frequency signals, radio waves signals are formed as the "1" and "0" for providing to the central processing unit. The communication processes of the present invention is same to the conventional radio frequency signals, and will not be described herein redundantly.

In the first embodiment of the present invention, the visible light reception unit 201 comprises a light sensitive diode D1 and a first resistor R1. A negative terminal of the light sensitive diode D1 is connected with a power supply end VCC. A positive terminal of the light sensitive diode D1 is connected with the amplifier unit 202. The positive terminal of the light sensitive diode D1 is further grounded through the first resistor R1.

The amplifier unit 202 comprises a transistor Q1 and a second resistor R2. A base of the transistor Q1 is connected with the positive terminal of the light sensitive diode D1. The base of the transistor Q1 is further grounded through the first resistor R1. A collector of the transistor Q1 is connected to the power supply end VCC through the second resistor R2. The collector of the transistor Q1 is further connected with the negative input end of the comparator IC1. An emitter of the transistor Q1 is grounded.

The amplifier unit 202 can also be implemented in some other way, such as an operational amplifier. A weak electrical signal converted from the light sensitive diode D1 is correspondingly multiply amplified according to an amplification factor. Moreover, the amplifier unit 202 and the comparator IC1 can also be disposed on the central processing unit, and they are not limited to those disclosed herein.

When the light sensitive diode D1 receives data from the visible light, the visible light is converted to an electrical signal. The transistor amplifies the electrical signal and outputs a corresponding voltage to the comparator 101, which compares it with a reference voltage. If the voltage is greater than the reference voltage, "1" is inputted. If the voltage is smaller than the reference voltage, "0" is inputted. The central processing unit 30 receives and correspondingly processes the quantified signal.

Figure 3:
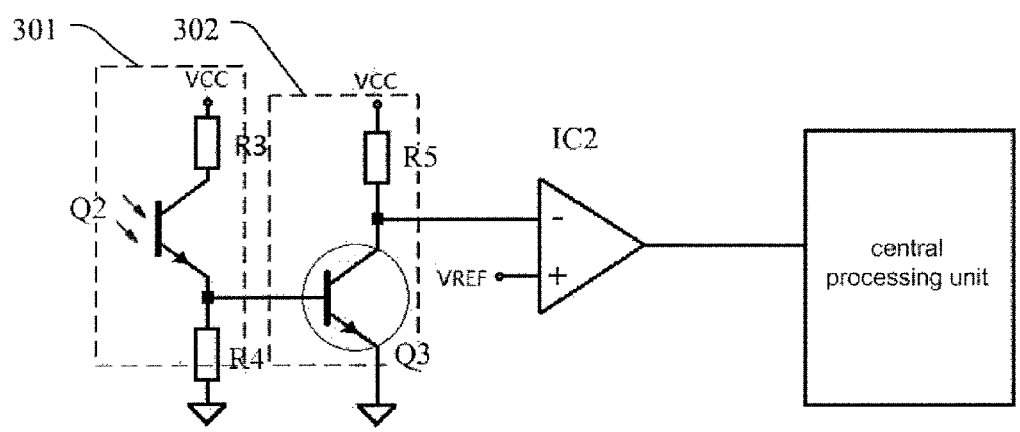
FIG. 3 is a circuit diagram of a visible light reception module of the nonradiative communication terminal using visible light for communication of the present invention of a second preferable embodiment of the present invention.

Please refer to FIG. 1 and FIG. 3. FIG. 3 is a circuit diagram of a visible light reception module of the nonradiative communication terminal using visible light for communication of the present invention of a second preferable embodiment of the present invention. In this embodiment, the visible light reception module comprises a visible light reception unit 301, an amplifier unit 302, and a comparator IC2. Comparing the second preferable embodiment and the first preferable embodiment, the difference is that the visible light reception unit 301 utilizes different electrical elements.

In this embodiment, the visible light reception unit 301 comprises a light sensitive transistor Q2, a transistor Q3, a third resistor R3, and a fourth resistor R4. A collector of the light sensitive transistor Q2 is connected to a power supply end VCC through the third resistor R3. An emitter of the light sensitive transistor Q2 is grounded through the fourth resistor R4. A base of the light sensitive transistor Q2 receives an external visible light signal. A base of the transistor Q3 is connected with the emitter of the light sensitive transistor Q2.

When the light sensitive transistor Q2 receives data from the visible light, the visible light is converted to an electrical signal. The transistor Q3 amplifies the electrical signal and outputs a corresponding voltage to the comparator IC2, which compares it with a reference voltage. If the voltage is greater than the reference voltage, "1" is inputted. If the voltage is smaller than the reference voltage, "0" is inputted. The central processing unit 30 receives and correspondingly processes the quantified signal.

Since the transmission of light will be affected by distance (the communication distance of the nonradiative communication terminal of the present invention is less than 10 meters), a barrier, reflection and refraction of light, etc., the visible light communication is unsuitable for using in some situations. Thus, the nonradiative communication terminal using visible light for communication of the present invention further comprises a functional module which is the same as the conventional radio frequency communication terminal. When the visible light cannot be transmitted and received, the radio waves are used for communicating. Therefore, the nonradiative communication terminal of the present invention also comprises a radio frequency module, a battery, a power manager, a motor, a microphone, a loudspeaker, an USB interface, a SIM card slot, a touch display screen, a SD/MMC module, a camera, a RAM, a ROM, an XO, etc. Since the theories of communication by using radio waves, signal identification (e.g. the nonradiative communication terminal of the present invention identifies the visible light signal transmitted from a corresponding communication terminal by using a time-scale), and touch operation of the present invention are same to the prior art, these will not be described herein redundantly.

The present invention further provides a communication system using visible light for communication, which comprises at least two nonradiative communication terminals which communicate by visible light. The technical solutions of communicating between the nonradiative communication terminals by using the visible light are described above, and will not be described herein redundantly.

From the above, in the present invention, the nonradiative communication terminal and the communication system use visible light to communicate, so the advantages, such as nonradiation, saving frequency resources, stability and reliability in communication performance, low-cost communication, and a high transmission speed are achieved.

In addition, since the transmission speed of the visible light can achieve hundred megabytes or even more than 1 Gbps, the present invention has further advantages, such as a high transmission speed and stability and reliability in communication performance. The present invention does not need to occupy frequency resources thereby greatly reducing a communication cost.

It should be noted that those of ordinary skill in the art can make replacements or variations according to the technical solutions and conceptions of the present invention, and all of the replacements and variations should be contained within the scope of the attached claims of the present invention.

What is claimed is:

1. A nonradiative communication terminal using visible light for communication, comprising:
   a visible light emission module for emitting visible light;
   a visible light reception module for receiving the visible light and converting the visible light to an electrical signal; and
   a central processing unit for controlling working statuses of the visible light emission module and the visible light reception module and processing data transmitted from the visible light emission module and received by the visible light reception module,
   wherein the visible light emission module and the visible light reception module are respectively connected with the central processing unit;
   wherein the visible light emission module comprises a light emitting diode and a high-speed switch; and
   wherein a negative terminal of the light emitting diode is grounded, and a positive terminal of the light emitting diode is connected with a first end of the high-speed switch, and a second end of the high-speed switch and a controlling terminal of the high-speed switch are respectively connected with the central processing unit;
   wherein the visible light reception module comprises:
   a visible light reception unit for receiving the visible light and converting the visible light to the electrical signal;
   an amplifier unit for amplifying the electrical signal outputted from the visible light reception unit; and
   a comparator for performing a quantification operation on a signal from the amplifier unit;
   the visible light reception unit is connected to a negative input end of the comparator through the amplifier unit, and a positive input end of the comparator is connected with a voltage reference, and an output end of the comparator is connected with the central processing unit;
   wherein the visible light reception unit comprises a light sensitive diode and a first resistor; and
   wherein a negative terminal of the light sensitive diode is connected with a power supply end (VCC), and a positive terminal of the light sensitive diode is connected with the amplifier unit, and the positive terminal of the light sensitive diode is further grounded through the first resistor.

2. The nonradiative communication terminal using visible light for communication according to claim 1, wherein the central processing unit comprises a resistance adjustment unit which is connected with the second end of the high-speed switch for controlling luminance of the light emitting diode.

3. The nonradiative communication terminal using visible light for communication according to claim 1, wherein the light emitting diode is turned on when the central processing unit outputs a high voltage to the controlling terminal of the high-speed switch; and the light emitting diode is turned off when the central processing unit outputs a low voltage to the controlling terminal of the high-speed switch.

4. The nonradiative communication terminal using visible light for communication according to claim 1, wherein if the visible light is present after performing the quantification operation by the comparator, the output end of the comparator outputs a high voltage to the central processing unit; if the visible light is absent after performing the quantification operation by the comparator, the output end of the comparator outputs a low voltage to the central processing unit.

5. The nonradiative communication terminal using visible light for communication according to claim 1, wherein the amplifier unit comprises a transistor and a second resistor; and
   wherein a base of the transistor s connected with the positive terminal of the light sensitive diode, and the base of the transistor is further grounded through the first resistor, and a collector of the transistor is connected to the power supply end (VCC) through the second resistor, and the collector of the transistor is further connected with the negative input end of the comparator, and an emitter of the transistor is grounded.

6. A nonradiative communication system using visible light for communication, comprising at least two nonradiative communication terminals which communicate by the visible light,
   wherein the nonradiative communication terminal using the visible light for communication comprises:
   a visible light emission module for emitting the visible light;
   a visible light reception module for receiving the visible light and converting the visible light to an electrical signal; and
   a central processing unit for controlling working statuses of the visible light emission module and the visible light reception module and processing data transmitted from the visible light emission module and received by the visible light reception module,
   wherein the visible light emission module and the visible light reception module are respectively connected with the central processing unit;
   wherein the visible light emission module comprises a light emitting diode and a high-speed switch, and
   wherein a negative terminal of the light emitting diode is grounded, and a positive terminal of the light emitting diode is connected with a first end of the high-speed switch, and a second end of the high-speed switch and a controlling terminal of the high-speed switch are respectively connected with the central processing unit;
   wherein the visible light reception module comprises:
   a visible light reception unit for receiving the visible light and converting the visible light to the electrical signal;
   an amplifier unit for amplifying the electrical signal outputted from the visible light reception unit; and
   a comparator for performing a quantification operation on a signal from the amplifier unit;
   the visible light reception unit is connected to a negative input end of the comparator through the amplifier unit, and a positive input end of the comparator is connected with a voltage reference, and an output end of the comparator is connected with the central processing unit;
   wherein the visible light reception unit comprises a light sensitive transistor, a third resistor, and a fourth resistor; and
   wherein a collector of the light sensitive transistor is connected to the Power supply end (VCC) through the third resistor, and an emitter of the light sensitive transistor is grounded through the fourth resistor, and a base of the light sensitive transistor receives an external visible light signal.

7. The nonradiative communication system using visible light for communication according to claim 6, wherein the central processing unit comprises a resistance adjustment unit which is connected with the second end of the high-speed switch for controlling luminance of the light emitting diode.

8. The nonradiative communication system using visible light for communication according to claim 6, wherein the light emitting diode is turned on when the central processing unit outputs a high voltage to the controlling terminal of the high-speed switch; and the light emitting diode is turned off when the central processing unit outputs a low voltage to the controlling terminal of the high-speed switch.

9. The nonradiative communication system using visible light for communication according to claim 6, wherein if the visible light is present after performing the quantification operation by the comparator, the output end of the comparator outputs a high voltage to the central processing unit; if the visible light is absent after performing the quantification operation by the comparator, the output end of the comparator outputs a low voltage to the central processing unit.

10. The nonradiative communication system using visible light for communication according to claim 6, wherein the amplifier unit comprises a transistor and a fifth resistor; and
   wherein a base of the transistor is connected with the emitter of the light sensitive transistor, and the base of the transistor is further grounded through the fourth resistor, and a collector of the transistor is connected to the power supply end (VCC) through the fifth resistor, and the collector of the transistor is further connected with the negative input end of the comparator, and an emitter of the transistor is grounded.

* * * * *